United States Patent [19]

Mihalka

[11] Patent Number: 4,586,118
[45] Date of Patent: Apr. 29, 1986

[54] CAPACITOR CHARGING FET SWITCHER WITH CONTROLLER TO ADJUST PULSE WIDTH

[75] Inventor: Alex M. Mihalka, Livermore, Calif.

[73] Assignee: The United States of America as represented by the United States Department of Energy, Washington, D.C.

[21] Appl. No.: 617,651

[22] Filed: Jun. 5, 1984

[51] Int. Cl.⁴ .................... H02M 3/337; H02H 7/122
[52] U.S. Cl. ........................................ 363/17; 320/1;
363/49; 363/56; 363/98
[58] Field of Search .................. 320/1; 363/17, 49, 56,
363/98, 80; 372/82; 315/241 R

[56] References Cited

U.S. PATENT DOCUMENTS

| | | | |
|---|---|---|---|
| 3,257,604 | 6/1966 | Colclaser et al. | 363/132 |
| 3,299,370 | 1/1967 | Massey . | |
| 3,579,078 | 5/1971 | Cronin | 363/17 |
| 4,204,266 | 5/1980 | Kammiller | 363/98 |
| 4,233,557 | 11/1980 | Alberkrack | 363/20 |
| 4,325,113 | 4/1982 | Tomlie | 363/60 |
| 4,344,124 | 8/1982 | Panicali | 363/49 |
| 4,399,499 | 8/1983 | Butcher et al. | 363/17 |

FOREIGN PATENT DOCUMENTS 197801 1/1978 U.S.S.R. .................................. 320/1

OTHER PUBLICATIONS

IBM Tech. Discl. Bul., vol. 26, No. 5, pp. 2246–2248, Oct. 1983.
Electronic Product Design, pp. 21, 22 & 27, Jan. 1981.

Primary Examiner—William H. Beha, Jr.
Attorney, Agent, or Firm—Henry P. Sartorio; Clifton E. Clouse, Jr.; Judson R. Hightower

[57] ABSTRACT

A switching power supply includes an FET full bridge, a controller to drive the FETs, a programmable controller to dynamically control final output current by adjusting pulse width, and a variety of protective systems, including an overcurrent latch for current control. Power MOSFETS are switched at a variable frequency from 20–50 kHz to charge a capacitor load from 0 to 6 kV. A ferrite transformer steps up the DC input. The transformer primary is a full bridge configuration with the FET switches and the secondary is fed into a high voltage full wave rectifier whose output is connected directly to the energy storage capacitor. The peak current is held constant by varying the pulse width using predetermined timing resistors and counting pulses. The pulse width is increased as the capacitor charges to maintain peak current. A digital ripple counter counts pulses, and after the desired number is reached, an up-counter is clocked. The up-counter output is decoded to choose among different resistors used to discharge a timing capacitor, thereby determining the pulse width. A current latch shuts down the supply on overcurrent due to either excessive pulse width causing transformer saturation or a major bridge fault, i.e., FET or transformer failure, or failure of the drive circuitry.

14 Claims, 10 Drawing Figures

CAPACITOR CHARGING FET SWITCHER WITH CONTROLLER TO ADJUST PULSE WIDTH

The U.S. Government has rights in this invention pursuant to Contract No. W-7405-ENG-48 between the U.S. Department of Energy and the University of California, for the operation of Lawrence Livermore National Laboratory

FIELD OF THE INVENTION

The invention relates to power supplies and more particularly to high voltage switching power supplies for capacitive loads.

BACKGROUND OF THE INVENTION

In a high power glass laser system, high voltage power supplies are necessary for simmering and flashing the smaller (1 cm) laser rod amplifier lamps. The simmer power supply charges a 35 $\mu f$ load capacitor and keeps the lamp turned on continuously by providing 70-110 milliamps of DC current. The flashlamp power supply charges a 120 $\mu f$ capacitor and regulates its voltage before the capacitor energy is discharged into the lamp to flash the lamp. Conventional 60 Hz supplies are large, heavy and costly. A power supply to linearly charge a capacitor is desired. The problem in charging a capacitor is tnat the load varies through the charge cycle. Initially the load is at the maximum but as the capacitor charges the power supply in effect sees a smaller capacitance. Accordingly, a power supply is desired which can vary the pulse width as the load changes to maintain peak current.

Accordingly, it is an object of the invention to provide a switching power supply for linearly charging a capacitor.

It also an object of the invention to provide a power supply which linearly charges a capacitor as the load varies during the charge cycle.

It is a further object of the invention to provide a constant peak current switching power supply operable over a frequency from 50 to 20 kHz.

It is also an object of the invention to provide voltage regulation at any voltage from 0 to 5 kV.

It is another object of the invention to provide a power supply having current control functions including overcurrent protection.

It is a further object of the invention to provide a switching power supply having a programmable controller for preselecting desired output characteristics.

It is also an object of the invention to provide a small, lightweight, modular switching power supply.

SUMMARY OF THE INVENTION

The invention is a repeatable capacitor charging, switching power supply. A ferrite transformer steps up a DC input. The transformer primary is in a full bridge configuration utilizing power MOSFETs as the bridge switches. The transformer secondary is fed into a high voltage, full wave rectifier whose output is connected directly to the energy storage capacitor. The transformer is designed to provide adequate leakage inductance to limit capacitor current. The MOSFETs are switched to the variable frequency from 20-50 kHz to charge a capacitor from 0-6 kV. The peak current in a transformer primary and secondary is controlled by increasing the pulse width as the capacitor charges. A digital ripple counter counts pulses and after a preselected desired number is reached an up-counter is clocked. The up-counter output is decoded to determine pulse width by choosing among eight different resistors used to discharge a timing capacitor. The dead time between pulses is fixed so the power supply frequency varies over a 3 to 1 range. The controller circuit drives the FETs of the full bridge switcher. The programmable soft start circuit dynamically controls current peaks by periodically adjusting pulse width. A variety of protective systems including voltage control circuits and current control circuits are included. The current control circuit includes an overcurrent latch to protect the transistors from all faults. Fast recovery diodes in the bridge, one in series with each FET in each leg of the bridge and one reverse-biased across each leg, provide excellent fast turn-off characteristics, eliminate ringing through the transistors and dump stored energy from the transformer to the load at the end of each cycle.

DETAILED DESCRIPTION

Figure 1:
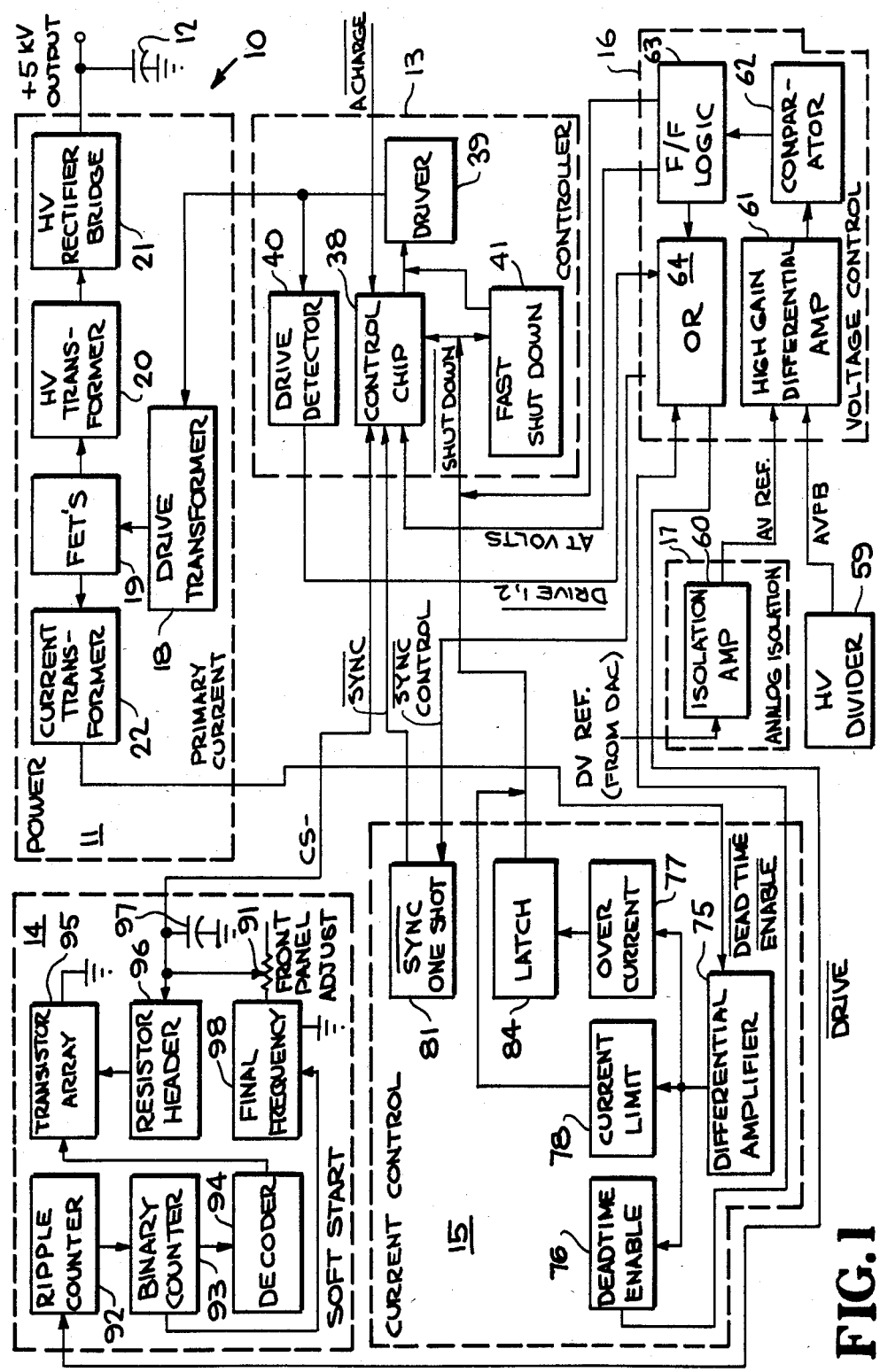
FIG. 1 is a block diagram of the switching power supply.

Switching power supply 10, illustrated as a block diagram in FIG. 1, comprises power circuit 11 which provides a high voltage output, e.g., 5 kV, to capacitor 12. Controller circuit 13 is connected to power circuit 11, and also to soft start circuit 14. Current control circuit 15 and voltage control circuit 16 are also connected to controller circuit 13 and analog isolation circuit 17 is connected to voltage control circuit 16.

Figure 2:
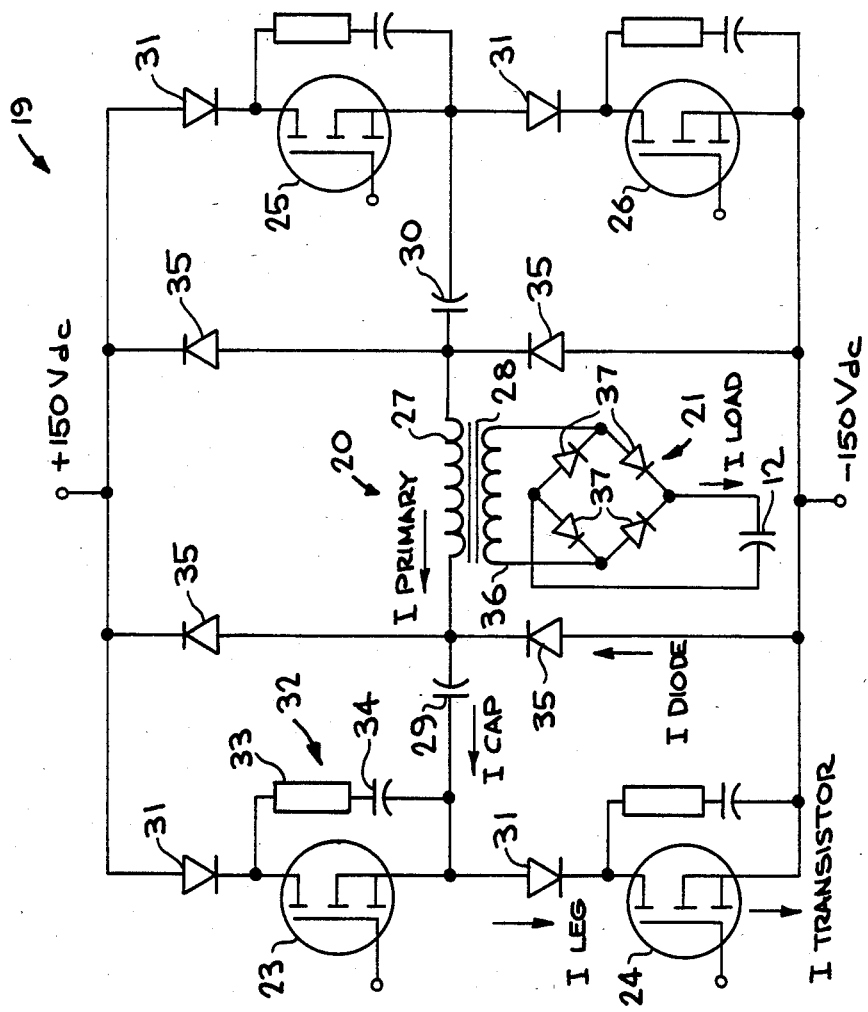
FIG. 2 is a schematic diagram of the power circuit of the switching power supply.

Power circuit 11 comprises drive transformer 18 which drives an FET array 19. The FET array 19 is connected to a high voltage transformer 20 whicn is connected tnrough a high voltage rectifier bridge 21 to the load, capacitor 12. The FET array 19 is also connected to current transformer 22 for detecting primary current in the circuit. Tne details of FET array 19 are shown schematically in FIG. 2. FET array 19 comprises four FET transistors 23, 24, 25, 26, typically IRF 440 power MOSFETs, arranged in a full bridge configuration connected to the primary 27 of high voltage transformer 20. A conventional 60 hz, full wave rectified power supply (not shown) is connected to the bridge to provide approximately ±150 V DC across the bridge, as shown. Diagonal pairs of the FET transistors, 23-26 or 24-25, in the full bridge primary are alternately turned on and off, by signals from drive transformer 18 applied to the gates of the transistors, to keep an alternating flux in the transformer core 28. Typically, drive transformer 18 has two secondary windings, one for each pair of FETs. The pair of capacitors 29 and 30 in series with the transformer 20 prevent a DC bias from the core in the event that current in one direction is held on longer than the other. Each leg of the bridge primary contains a fast recovery rectifier or diode 31 in series with the FET transistor. At the end of a cycle the diodes 31 prevent ringing through the diagonal pair of FETs, transformer 20, and power supply. The diodes 31 snap off quickly after they become back biased, providing fast turn off characteristics. Each FET transistor has a snubber circuit 32 connected across the FET to prevent transistor transient voltage spikes at turn off. The snubber 32 comprises a resistor 33 in series with a capacitor 34, witn the resistor value chosen to limit the snubber capacitor discharge at turn off to a preselected current, e.g., 3 amps. The capacitor is then chosen to limit transient turn off voltage. Four fast recovery rectifiers or diodes 35 are connected around the transformer 20, one across each leg of the FET full bridge array, to allow a path for transformer stored energy to be transferred to the load when all bridge transitors are off.

The transformer secondary 36 of high voltage transformer 20 is connected to a full wave rectifier 21 made up of high voltage, fast recovery diodes 37. The output of bridge 21 is connected directly to the capacitor 12 without benefit of an output inductor. The transformer 20 is designed to provide enough inductance to limit rate of rise of current.

Since the power supply is designed to linearly charge a capacitor, the load varies through the charge cycle. At first the load is great and di/dt of load current is at a maximum. As the capacitor charges the initial conditions for each cycle change; the power supply in effect sees a smaller capacitance and di/dt decreases. Accordingly, it is necessary to gradually increase the on time of the transistors so that they are turned off when they reach their maximum allowable peak current. This fully utilizes the power supply by charging linearly.

Control circuit 13 contains control chip 38 which in one preferred embodiment is a Silicon General 3526 regulating pulse width modulator. The current sensor response of control chip 38 is not fast enough to produce the desired result of constant current peaks. The deadtime or time that all the transistors are turned off is fixed so that as the pulse width varies so does the period, which produces a constant peak current, variable frequency switching power supply. Pulse width modulation is not performed because of the possibility of unequal on times at certain set voltages which may result in fractional pulses between regulating periods which will eventually saturate the transformer and cause the sensitive overcurrent latch to shut down the supply. Instead, alternating whole pulses are produced. Control chip 38 is operated in an unconventional manner with various function blocks on the chip used for other than their conventional purposes.

Figure 3:
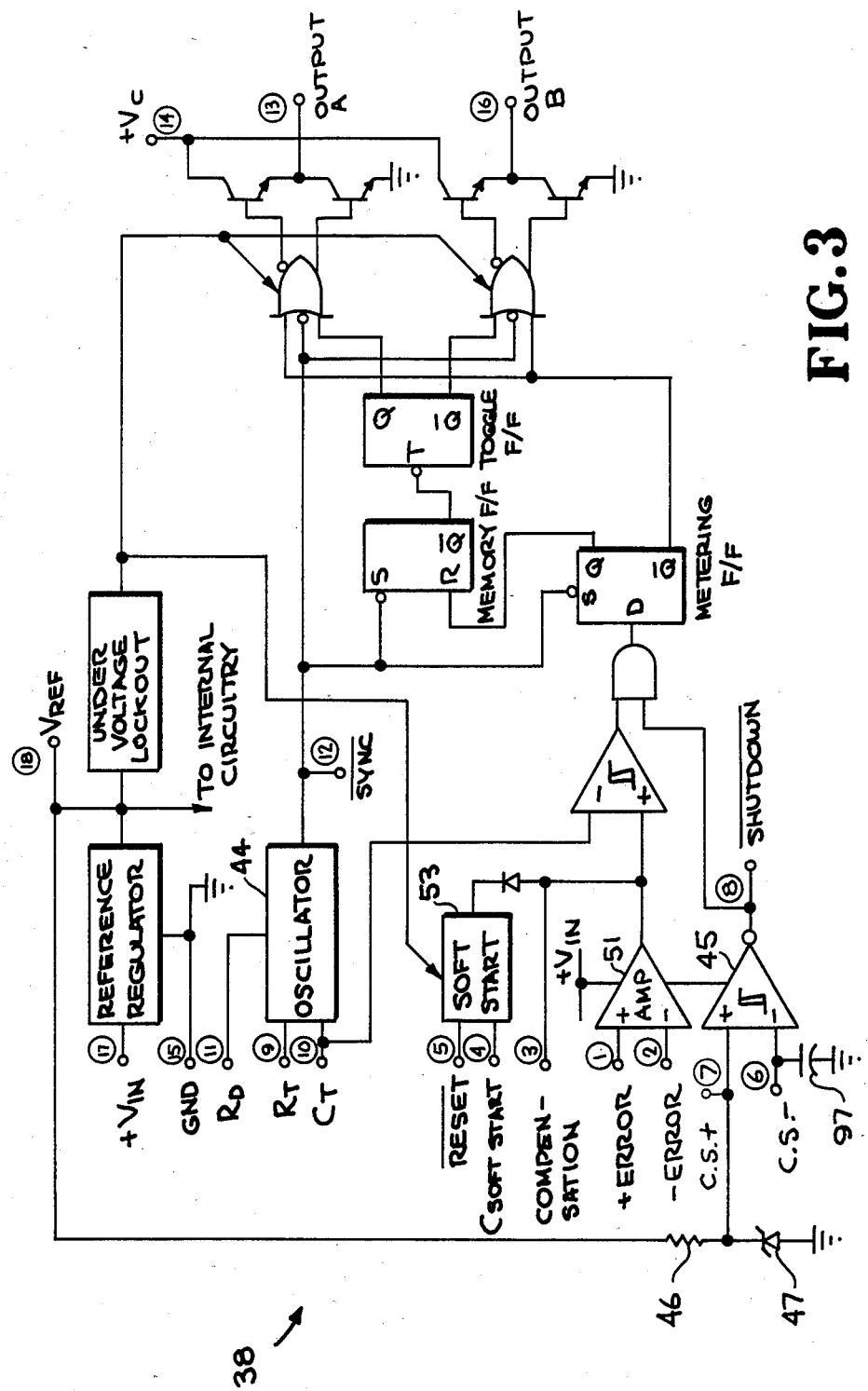
FIG. 3 is a block diagram of the control chip.
Figure 4:
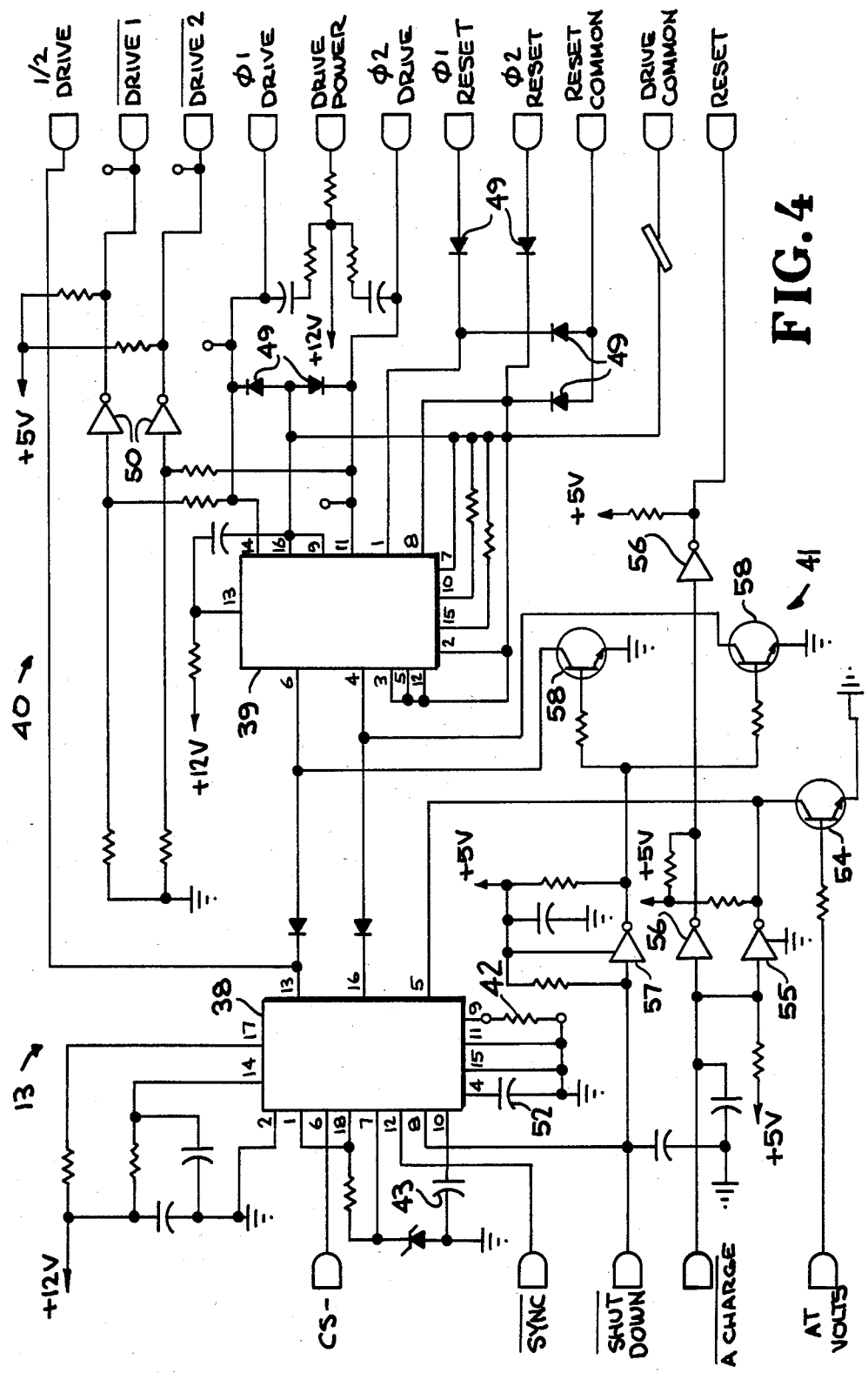
FIG. 4 is a schematic diagram of the controller circuit.

Tne control chip 38 feeds a driver 39, e.g., a Silicon General 3627 high current output driver, which is connected to transformer 18 which drives the gates of the FETs in array 19. A block diagram of the control chip 38 is shown in FIG. 3, which shows the pin arrangement of a Silicon General 3526 chip as utilized according to the invention. A schematic diagram of the controller circuit 13 is shown in FIG. 4. A $\overline{\text{SHUTDOWN}}$ signal ($\overline{\text{SD}}$) from current control circuit 15 is applied to both control chip 38 and fast shutdown circuit 41. $\overline{\text{SD}}$ can be pulled down either internally by the CS− signal from soft start circuit 14 or externally by one of three signals.

Resistor 42 and capacitor 43 in controller circuit 13 determine the frequency of the oscillator 44 of control chip 38; the output of oscillator 44 is connected to $\overline{\text{SYNC}}$ signal from current control circuit 15. If CS− (pin 6) and $\overline{\text{SYNC}}$ (pin 12) were left alone, control chip 38 would produce pulses at the natural frequency of oscillator 44. Resistor 42 must be chosen such that the natural frequency is less than the lowest programmable frequency, otherwise the natural frequency will cut short the pulse length by pulling down $\overline{\text{SYNC}}$. $\overline{\text{SYNC}}$ is used to stop the pulse and fix the dead time and when it goes high it automatically toggles the output phase (between outputs A and B of control chip 38). Generally, the natural frequency is kept 10–20 percent lower than the lowest programmable frequency which for a specific embodiment is about 18 kHz. Since dead time is controlled externally by holding down $\overline{\text{SYNC}}$, pin 11 is tied directly to ground, although alternatively pin 11 can be tied to ground through a resistor to program the dead time.

The first of the external signals which pulls $\overline{\text{SD}}$ low is the AT VOLTS signal from voltage control circuit 16. The AT VOLTS signal holds $\overline{\text{SD}}$ low while the output is at or above the set voltage; otherwise, control chip 38 would run free at its own natural frequency determined by the RC network. The other two external signals that hold $\overline{\text{SD}}$ low come from the current control circuit 15. One of these signals is a current limit signal which turns off the pulse when current is slightly higher than normal but allows the next pulse to proceed. The other signal is an overcurrent latch signal which turns off the pulse and does not allow another. Current control circuit 15 also provides a $\overline{\text{SYNC}}$ signal to hold the control chip oscillator 44 output low to prevent output pulses. The $\overline{\text{SYNC}}$ signal is the same signal that controls the dead time between pulses.

The CS− signal from soft start circuit 14 is fed to comparator 45 on control chip 38 at pin 6. Although pin 6 of comparator 45 is conventionally used for current regulation, according to the present invention it is utilized to control the pulse width. The other input of comparator 45 CS+ is connected to a Zener reference; a 5 volt reference signal is produced by control chip 38 at pin 18. A stable voltage is placed on the CS+ input of comparator 45 by connecting pin 7 to the reference voltage through resistor 46; pin 7 is also connected through Zener diode 47, e.g. a 1N746, to ground. The output of comparator 45 is connected internally to the $\overline{\text{SD}}$ signal, pin 8. The CS− input, pin 6, is connected to the timing capacitor 97 of soft start circuit 14 and comparator 45 trips at the Zener voltage applied to the CS+ input, pin 7, thereby producing the desired pulse width. Outputs A and B, pins 13 and 16 respectively of control chip 38, are connected to the inputs of driver 39, for example an SG-2637 chip, at pins 6 and 4 respectively. Diodes 49, e.g. 1N4447, are steering diodes for the drive transformer 18. The outputs of driver 39 are obtained at pins 14 and 11; these outputs, $\phi 1$ DRIVE and $\phi 2$ DRIVE are fed to drive transformer 18 to drive the two diagonal pairs of FETs. These outputs are also connected to drive detector 40 which divides the 24 volts from the phase not being driven to a TTL level; the outputs from driver 39 are inverted by means of inverters 50, e.g. 74S04, to produce signals $\overline{\text{DRIVE 1}}$ and $\overline{\text{DRIVE 2}}$. Positive output from control chip 38 causes driver chip 39 output to go low for the phase that is being turned on. The input at pin 1 to error amplifier 51 on control chip 38 is also connected to the reference voltage from pin 18, while the other input at pin 2 is tied to ground. Although error amplifier 51 is normally used for voltage feedback, in this configuration it is disabled.

The signal AT VOLTS from voltage control circuit 16 is used to soft start the control chip 38 pulses each time the power supply comes out of regulation. Soft starting lasts for about 1.5 milliseconds and gradually increases the pulse width to its final value. This is accomplished by letting $\overline{\text{RESET}}$ on control chip 38 go from low to high and is also done at the beginning of the charge cycle. Soft starting is necessary at regulation because the set voltage may be low so that pulse widths during initial regulating may be too wide, thereby causing the latch to trip. Capacitor 52 connected at pin 4 of soft start function block 53 of control chip 38 determines the duration of soft start. When the AT VOLTS signal goes high, transitor 54, e.g., a MPS-U45, turns on, pulling down $\overline{\text{RESET}}$ on pin 5 of soft start function block 53. Each time transistor 54 turns off, the control chip 38 soft starts. An A $\overline{\text{CHARGE}}$ signal is also applied to the $\overline{\text{RESET}}$ input of soft start function block 53 through inverter 55. When the A $\overline{\text{CHARGE}}$ signal goes low, thereby asking for a charge, inverter 55 releases $\overline{\text{RESET}}$ and chip 38 soft starts at the beginning of the charge cycle. The A $\overline{\text{CHARGE}}$ signal is also inverted twice by inverters 56 to produce an output signal RESET from controller circuit 13 which is utilized to reset counters on soft start circuit 14 and a one-shot on current control circuit 15 that holds the $\overline{\text{SD}}$ signal low at power up.

The $\overline{\text{SD}}$ signal goes low internally when CS− goes below CS+ at comparator 45; when $\overline{\text{SD}}$ goes low the pulse is stopped. Since the same Zener diode 47 and comparator 45 are used for each half cycle, the control chip 38 output pulse length is the same for positive and negative primary currents. $\overline{\text{SD}}$ is used externally to prevent pulses at current limit, overcurrent, voltage regulation, and power up. The $\overline{\text{SD}}$ signal is inverted by inverter 57 and applied to the bases of transistors 58, e.g., 2N2222's, which serve as the fast shutdown circuit 41. The collectors of transistors 58 pull down the outputs of control chip 38, at pins 13 and 16, 350 nanoseconds faster than the internal CMOS circuitry, thereby producing a more effective overcurrent latch.

Voltage control circuit 16 compares the set voltage with a feedback voltage from high voltage divider 59, which measures voltage across output capacitor 12. An output voltage DV REF is produced by digital to analog converter (not shown), which is the value of the output voltage that the user selects. This voltage is isolated from the analog circuits by isolation amplifier 60 in analog isolation circuit 17. The output from isolation amplifier 60 AV REF is input to a high gain differential amplifier 61 in voltage control circuit 16 along with the voltage feedback signal AVFB from high voltage divider 59. The output from differential amplifier 61 is input to an inherently hysteric comparator 62 whose output suppresses noise and oscillations. The output of comparator 62 is input to flip-flop logic 63 which generates the AT VOLTS signal.

Voltage control circuit 16 also includes a quad two-input OR gate 64 which receives the outputs $\overline{\text{DRIVE 1}}$ and $\overline{\text{DRIVE 2}}$ from drive detector 40 of controller circuit 13 and a $\overline{\text{DEADTIME ENABLE0}}$ ($\overline{\text{DE}}$) signal from current control circuit 15 and generates two output signals. One output signal of OR gate 64 is $\overline{\text{SYNC CONTROL}}$ which triggers a dead time one-shot in current control circuit 15. The other output is $\overline{\text{DRIVE}}$ which is the counter input to soft start circuit 14; when $\overline{\text{DRIVE}}$ is high one of the transistor pairs 23–26 or 24–25 is on.

Figure 5:
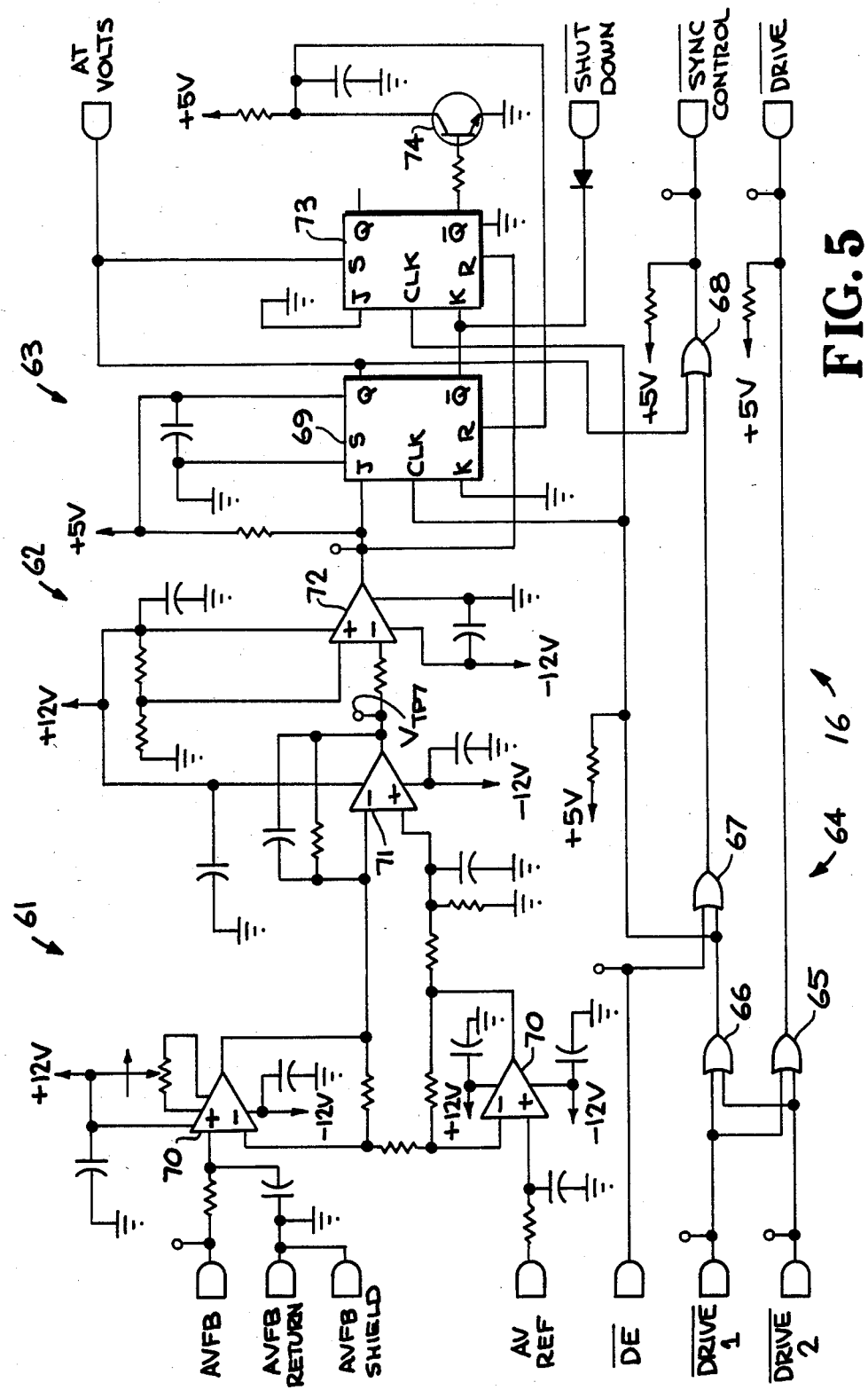
FIG. 5 is a schematic diagram of the voltage control circuit.

As shown in the schematic diagram of FIG. 5, the signals $\overline{\text{DRIVE 1}}$ and $\overline{\text{DRIVE 2}}$ from controller circuit 13 are input to a pair of OR gates 65 and 66, e.g., 7432's, in voltage control circuit 16. The output of OR gate 65 is the $\overline{\text{DRIVE}}$ signal which is input to soft start circuit 14 to count pulses. The output of OR gate 66 is input to OR gate 67 along with the $\overline{\text{DE}}$ signal to produce an output signal which says that the drive chip 39 is not driving and that the transistor current has fallen to a level low enough to start dead time. The output signal from OR gate 67 is input to OR gate 68 with output signal Q-1 from JK flip-flop 69, e.g., a 4027. The signal Q-1 from flip-flop 69 goes high when the set voltage has been equalled or surpassed. The output of OR gate 68 is the $\overline{\text{SYNC CONTROL}}$ signal which controls the timing of the $\overline{\text{SYNC}}$ one-shot in current control circuit 15. Since this one shot is a falling edge circuit deadtime will be inhibited until the power supply comes out of regulation and Q-1 goes low. Therefore, three conditions must be met before dead time can be started: the driver is off, the current is low, and the voltage is not above the set voltage.

High gain differential amplifier 61 comprises three operational amplifiers 70 and 71, e.g. LF 356's, having the inputs AV REF, the analog reference voltage from analog isolation circuit 17, and AVFB, the feedback voltage from high voltage divider 59, applied to the positive inputs of the two operational amplifiers 70, respectively, with the negative inputs of the two operational amplifiers being tied together. The outputs of the two operational amplifiers 70 are input to operational amplifier 71, which produces an output voltage $V_{TP7}=k(\text{AV REF} - \text{AVFB})$, where the gain k is determined by the resistor values. A high gain, e.g., 1030, is used to eliminate much of the noise in the feedback signal. $V_{TP}$ is held at $+12$ volts during the charge. This signal is fed to the minus input of comparator 72, e.g. an LM 311. The plus input of comparator 72 is biased at $+6$ volts so that its output is at 0 volts during the charge. When the feedback voltage exceeds the set voltage $V_{TP7}$ falls rapidly to $-12$ volts and the comparator output goes to $+12$ volts. The output of comparator 72 is input to flip-flop logic 63 which comprises a pair of JK flip-flops 69 and 73, e.g. 4027's. The output of comparator 72 is applied to the input J-1 of flip-flop 69 and to the reset R-2 of flip-flop 73. The inverted output $\overline{\text{Q-1}}$ is connected to the K-2 input of flip-flop 73. Inputs K-1 and J-2 of flip-flops 69 and 73, respectively, are grounded. The normal output Q-1 of flip-flop 69 is applied to the set S-2 of flip-flop 73. It is also connected to control chip 38 as the AT VOLTS signal. The set S-1 of flip-flop 69 is grounded. The inverted output $\overline{\text{Q-2}}$ of flip-flop 73 is connected to the base of transistor 74, e.g. a 2N2222, whose collector is connected to the reset R-1 of flip-flop 69. Flip-flops 69 and 73 are clocked by the output from OR gate 66.

Figure 6:
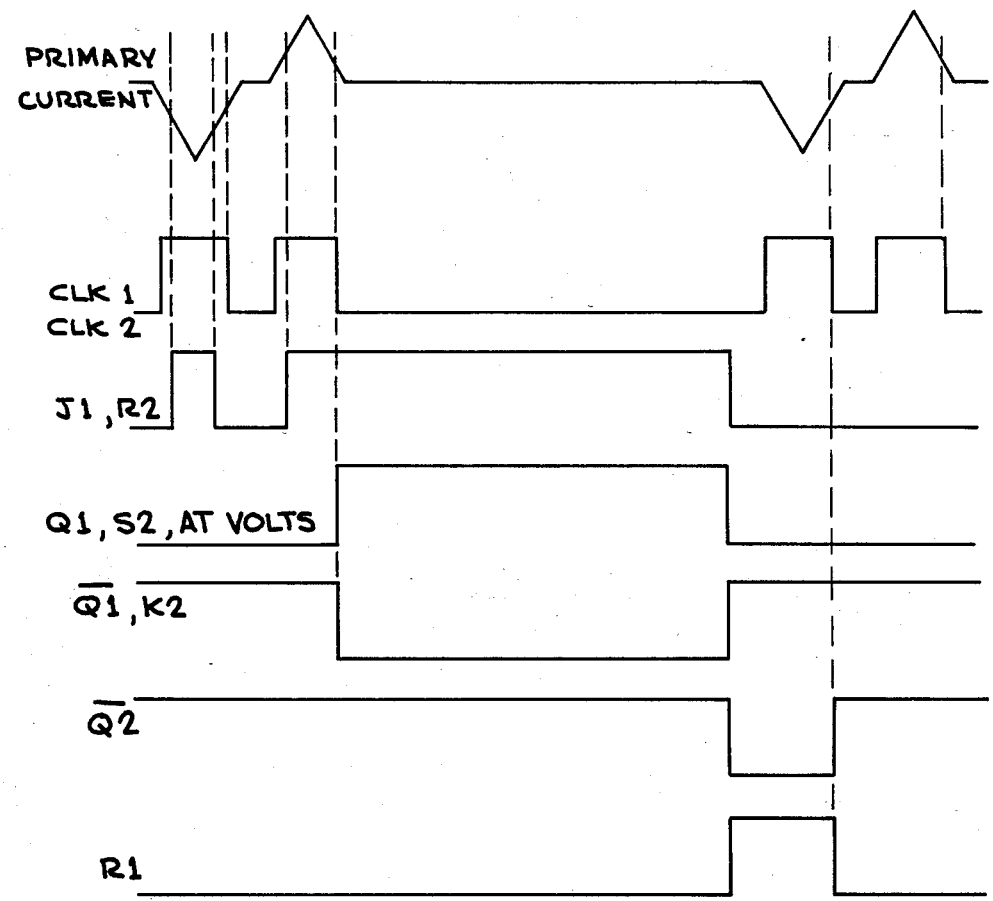
FIG. 6 is a diagram of flip-flop signals during regulation.

An illustration of operation is shown with reference to FIG. 6, which shows traces of various input and output signals to flip-flops 69 and 73 during regulation. The first pulse of J-1, the comparator 72 output, is shown going high some time during the current pulse but goes low again before the current pulse is over. In this case the output is either very close to regulation or J-1 goes high due to noise. Q-1, the output of flip-flop 69, stays low. If J-1 is high when the clock falls, Q-1 goes high. Q-1 is the AT VOLTS signal and when high it turns off control chip 38. When Q-1 goes low control chip 38 soft starts. Q-1 is allowed to go high only after the pulse is over since clock 1 is the same as $\overline{\text{DRIVE}}$. While Q-1 is high, $\overline{\text{Q-1}}$ is low, bringing down $\overline{\text{SD}}$ and disabling control chip 38. This is necessary because the natural frequency oscillator 44 will override the $\overline{\text{SYNC}}$ pulse and continue to charge. It is now necessary to recycle flip-flop 69 since clock 1 is disabled. During charging S-2 and R-2 are low, K-2 is high and clock 2 is $\overline{\text{DRIVE}}$. Q-2 will then be high and R-1 will be low because it is $\overline{\text{Q-2}}$ inverted through transistor 74. During regulation Q-1, S-2 and R-2 will be high and $\overline{\text{Q-2}}$ remains high since for this type of flip-flop (4027) both Q and $\overline{\text{Q}}$ will be high when S and R are high. Now the output comes out of regulation and R-2 goes low, forcing $\overline{\text{Q-2}}$ low, R-1 high and Q-1 low. When this happens control chip 38 soft starts after a dead time period since Q-1 also controls $\overline{\text{SYNC}}$ CONTROL. Flip-flop 73 is now set after the next clock pulse because S-2 and R-2 are low and K-2 is high. This provides a method of allowing only whole pulses, which prevents transformer saturation during regulation.

Figures 7A, 8B:
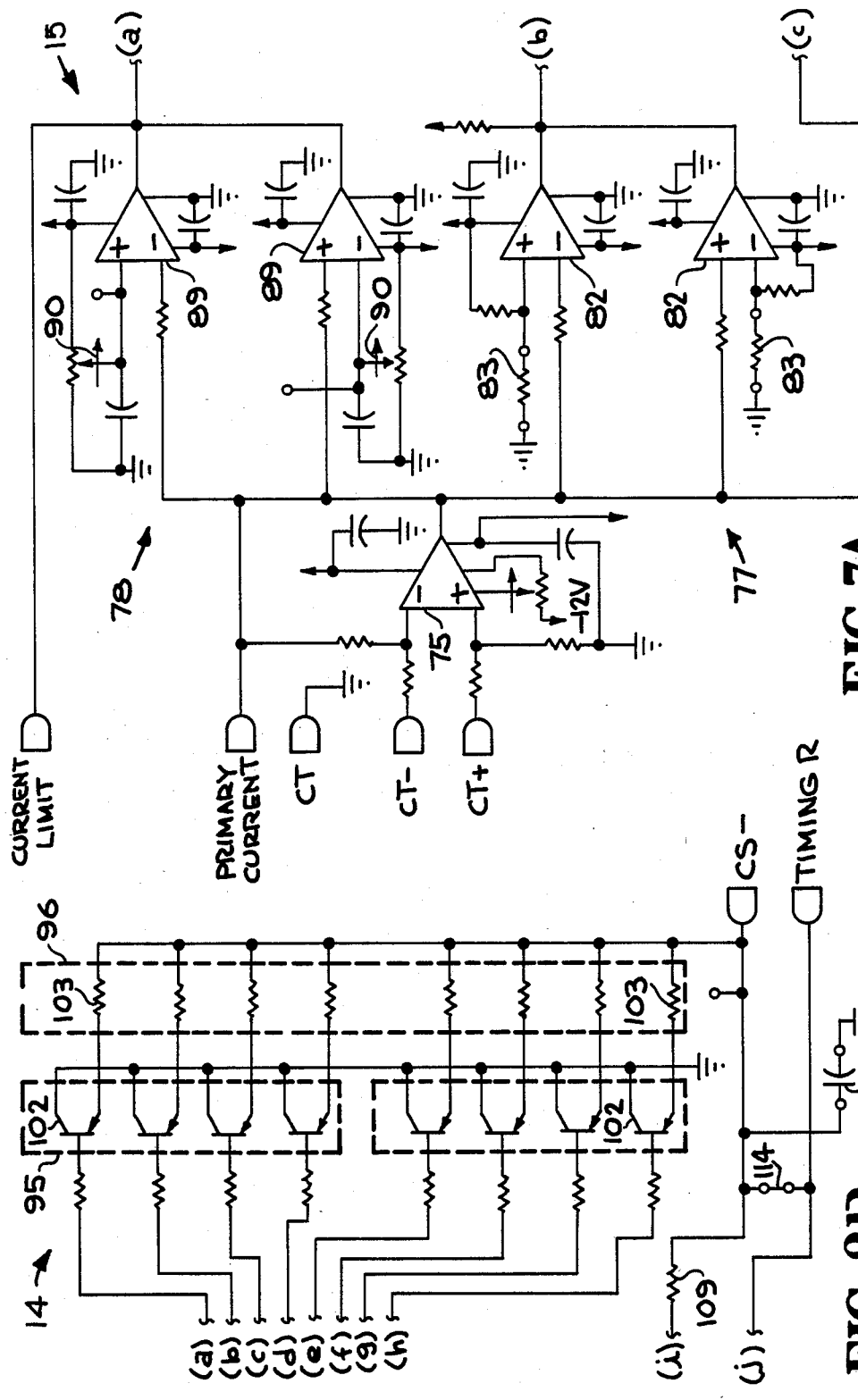
FIGS. 7A, B is a schematic diagram of the current control circuit.
Figure 7B:
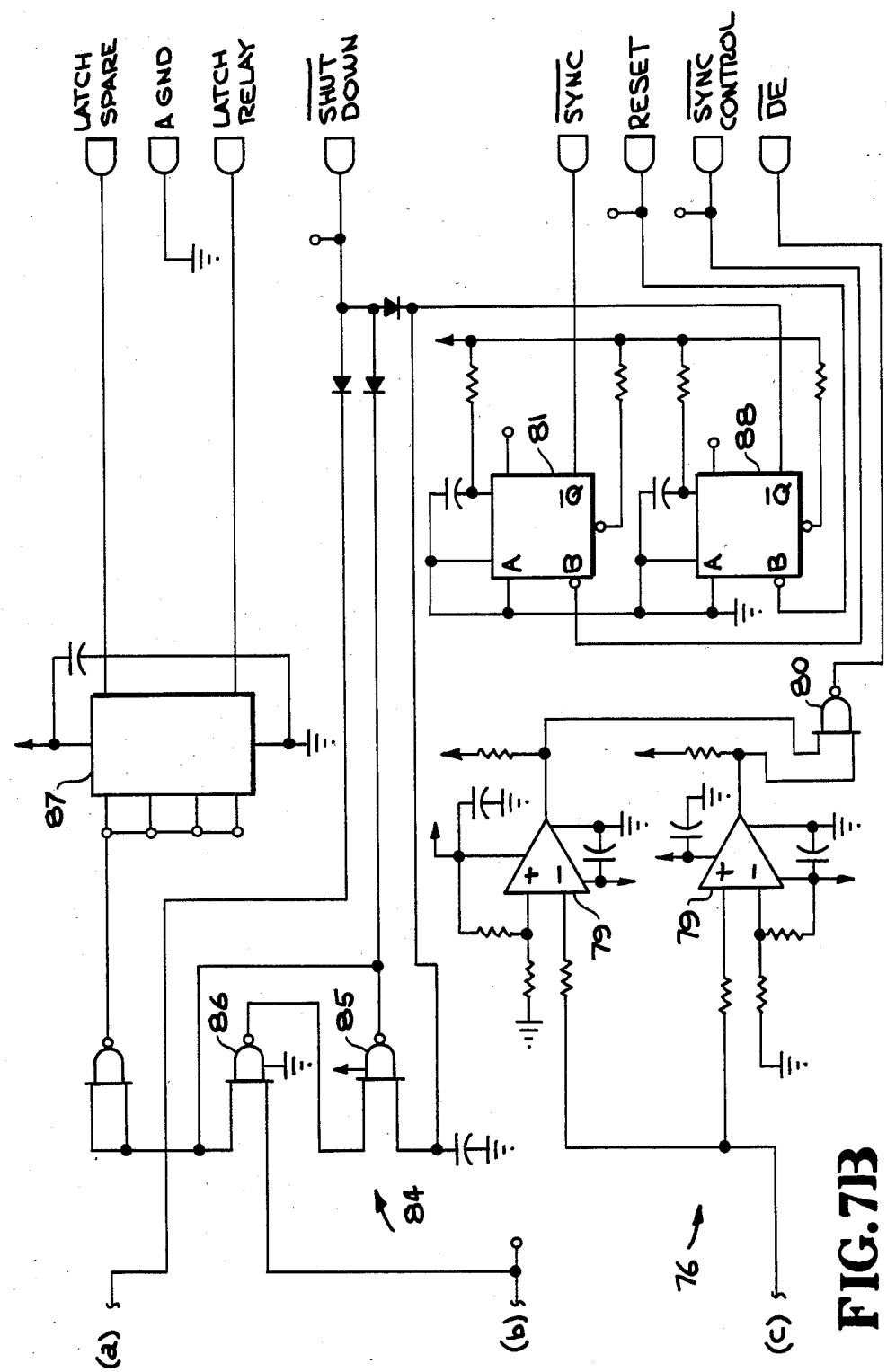

Current control circuit 15 includes differential amplifier 75, e.g. a LF 356, which takes output from the current transformer 22 in power circuit 11 and greatly reduces the noise. Shown in FIG. 7A, B the inputs to current control circuit 15 and differential amplifier 75 are the signals CT+ and CT− since the output of current transformer 22 is bipolar. The output from differential amplifier 75 is fed to three pairs of voltage comparators; the dead time enable comparator circuit 76, the overcurrent comparator circuit 77, and the current limit comparator circuit 78, one of each pair for positive pulses and the other for negative pulses.

The dead time enable pair 76 is set to detect a value of about 0.25 amps in either direction. The dead time enable circuit 76 includes a pair of comparators 79, e.g. LM 311's, a signal from differential amplifier 75 being input to the positive input of one comparator 79 and to the negative of the other comparator 79. The outputs of comparators 79 are input to NAND gate 80, e.g. a 74S00. The comparators 79 are set to detect when the absolute value of current is less than 0.25 amps. When this is true the inputs to NAND gate 80 will be high and the output $\overline{\text{DE}}$ will go low, enabling dead time to start. Thus when the output of dead time enable circuit 76 goes low it signifies a current that is low enough to start the dead time between pulses.

Signal $\overline{\text{DE}}$ is sent to OR gate 64 in voltage control circuit 16 as input to the $\overline{\text{SYNC}}$ CONTROL signal. $\overline{\text{DE}}$ is ORed with other signals which return a signal $\overline{\text{SYNC}}$ CONTROL, the output of OR gate 68 as shown in FIG. 5. When the $\overline{\text{SYNC}}$ CONTROL signal falls it triggers the $\overline{\text{SYNC}}$ one-shot 81 in current control circuit 15 which is typically set for 4 microseconds. The $\overline{\text{SYNC}}$ signal is tied directly to control chip 38; when $\overline{\text{SYNC}}$ goes low it resets the control chip oscillator 44 and when $\overline{\text{SYNC}}$ is high it toggles the output of control chip 38 and allows another pulse.

Overcurrent comparator circuit 77 includes comparators 82, e.g. LM 306's, whose trip level is fixed by user selectable resistors 83, the trip level being set above the peak rating of the transistors 23, 24, 25, 26. The outputs of the two comparators 82 are wire ANDed together, as are the outputs of each comparator pair. Typically the comparators 82 are set to detect a current that is about 5 amps higher than normal maximum operating current. A low output from the comparators 82 indicates that the transformer core 28 is saturated or there is a fault in primary bridge of array 19 or there is a fault in transformer 20. The output from overcurrent comparator circuit 77 is input to NAND gate latch circuit 84, which when triggered holds down $\overline{\text{SD}}$ and prevents the supply from further charging. The output of comparators 82 goes low when the set level is exceeded causing the output of NAND gate 85 to go low and pull down $\overline{\text{SD}}$. The output of NAND gate 85 also feeds back to the input of NAND gate 86 which latches the output of gate 85 low. The output of gate 85 also feeds line driver 87, e.g., a SN75452, which operates a relay (not shown) indicating an overcurrent. One input of gate 85 is connected to the output of one-shot 88, e.g. a MC 14528, which resets latch 84 whenever RESET goes low and also inhibits charging at power up. Latch 84 will remain low until another charge command goes from high to low.

The current limit circuit 78 is utilized to speed up latch circuit 84. The threshold is set to detect a current just above the maximum value of current that the power supply is programmed to deliver at any time. A low output usually signifies a fault condition and causes $\overline{\text{SD}}$ to go low before latch 84 does since it is set at a lower trip point, but the delays in fast shutdown circuit 41, driver 39 and the transistor turn off are long enough that the pulse is not cut off before the latch 84 trips. By speeding up the latch function about 15 amps of peak fault current are eliminated, allowing the latch function to operate and shut down the supply. The two comparators 89, e.g., LM 306's, of current limit circuit 78 are adjustable by potentiometers 90. When tripped the comparators 89 pull down $\overline{\text{SD}}$. The comparators 89 are set at about 1 amp greater than the maximum programmed current.

Soft start circuit 14 counts pulses and provides nine timers for pulse width variation. Soft start circuit 14 periodically adjusts the pulse width to maintain approximate peak current to the load. Front panel adjust potentiometer 91 allows the final pulse width to be easily set. Soft start circuit 14 provides signal CS− to comparator 45 of control chip 38 to gradually increase the width of groups of pulses. The size of the group is determined by the programmable number of counts. The function of soft start circuit 14 is not the same as that of soft start function block 53 in control chip 38 which gradually increases the width of each pulse over a period of 1.5 milliseconds during initial charge and during regulation.

The $\overline{\text{DRIVE}}$ signal from voltage control circuit 16 is input to a pair of ripple counters 92 which can count up to a maximum of $2^{26}$ pulses. The output of ripple counters 92 is input to binary up-counter 93. Every time the desired number of pulses is reached by the ripple counters 92 the binary counter 93 is incremented by one. The output of the binary counter 93 is fed to a decoder/demultiplexer 94 whose output selects one of eight transistors from transistor array 95 for different pulse widths. The emitter of each PNP transistor in array 95 is connected to a resistor contained in resistor header 96. The other end of each resistor is connected to the timing capacitor 97 which is also connected to ground. When its corresponding transistor is selected by decoder 94 each resistor discharges the timing capacitor 97 at a rate determined by the RC time constant. The timing capacitor voltage is the signal CS− which is fed to control chip 38 and which controls the pulse width by internally pulling down the $\overline{\text{SD}}$ signal as previously described. After binary counter 93 counts to eight it is inhibited from further counting and turns on a ninth transistor in final frequency circuit 98 to determine the final frequency or pulse width. Final frequency circuit 98 includes a user selectable discharge resistor which may be connected in series with potentiometer 91 located on the front panel for dynamic pulse width control.

Figure 8A:
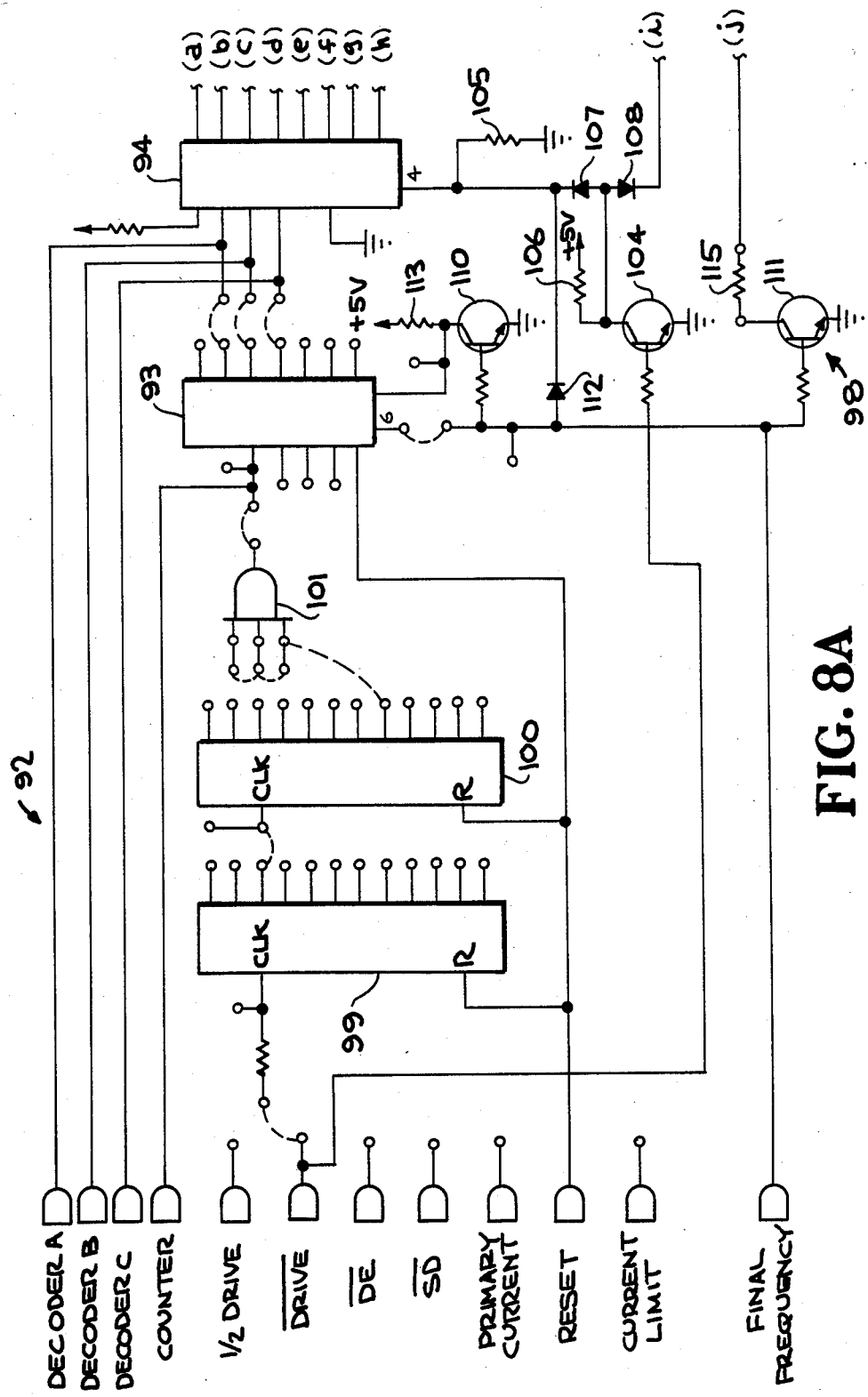
FIGS. 8A, B is a schematic diagram of the soft start circuit.

As further shown in FIG. 8A, B when a charge command is given RESET falls and counters 99 and 100 are cleared or reset to zero. Counters 99 and 100 are ripple carry binary counters with counter 99 having fourteen stages, e.g., a CD 4020, and counter 100 having twelve stages, e.g. a CD 4040. Thus, counter 99 can count up to $2^{14}$ pulses and counter 100 can count up to $2^{12}$ pulses, for a maximum count of $2^{26}$ pulses. The $\overline{\text{DRIVE}}$ signal follows the output of driver 39 and therefore is high when there is a pulse. $\overline{\text{DRIVE}}$ is connected to the clock of counter 99 and the output sequentially divides the drive frequency down by two. One of the outputs of counter 99 is connected to the clock of counter 100 and further division results at the counter 100 output. With $\overline{\text{DRIVE}}$ as the clock, the maximum count of $2^{26}$ pulses at 20 kHz will take about an hour, which is likely to be too long. However, any output from the counters 92 can be selected to increment binary up-counter 93, e.g. a CD 4520. A triple input AND gate 101, e.g. a CD 4073, is provided to choose a count between $2^n$ and $2^{n+1}$ where n is an integer, by connecting the appropriate outputs of counter 100 as inputs to AND gate 101. The output of AND gate 101 is connected to the clock of up-counter 93. By selection of the clock input to counter 100 and the input to AND gate 101 a suitable clock frequency can be applied to counter 93. Counter 93 is also cleared by the RESET signal. The output of up-counter 93 is connected to decoder 94, e.g. a 74LS138. Preferably the first three outputs of counter 93, which produce the eight counts from binary 000 to 111, are provided as the three inputs to 1 of 8 decoder 94. One of the eight outputs of decoder 94 goes low according to the binary input from counter 93. The low level on an output of decoder 94 turns on one of the PNP transistors 102 in the 8-transistor array 95, e.g. MPQ 2907's. One transistor 102 is connected to each output of decoder 94. All of the collectors of transistors 102 are connected to a common analog ground. The emitter of each transistor 102 is connected to a resistor 103 in resistor header 96. The other end of each resistor 103 is connected to the timing capacitor 97 which is connected between the resistors and ground. The timing capacitor 97 is discharged through whichever resistor 103 is selected by decoder 94 with an RC time constant determined by the value of the selected resistor, where capacitor 97 is typically 330 pf. The values of the eight resistors 103 are different preselected values; preferably the resistor connected to the first output of decoder 94 is the lowest value and produces the shortest pulse width while the resistor connected to the last output is the highest value and produces the longest pulse width. The particular resistor 103 is selected by the binary input on the decoder 94, and its value is determined by the point in the charge cycle. When the voltage on timing capacitor 97 goes below the Zener reference voltage applied to comparator 45 of control chip 38, the comparator 45 turns off the pulse. Thus the pulse width is determined by the value of the resistor 103 and capacitor 97. The $\overline{\text{DRIVE}}$ signal controls transistor 104 as well as being input to counter 99. Since the $\overline{\text{DRIVE}}$ signal is high when there is a pulse, the collector of transistor 104, e.g. a 2N2222, is low and resistor 105 connected between the enable input (pin 4) of decoder 94 and ground holds down pin 4 of decoder 94, enabling an output. When $\overline{\text{DRIVE}}$ is low (no pulse) pin 4 is high through resistor 106, diode 107 and resistor 105, turning off all the PNP transistors 102. Also during this time, timing capacitor 97 is recharged for another pulse through resistor 106, diode 108 and resistor 109.

The fourth output bit of counter 93 (pin 6) represents the ninth count (binary 1000) and is connected to the base of transistors 110 and 111, e.g., 2N2222, and to resistor 105 through diode 112. When the fourth output bit of counter 93 goes high, transistor 110 turns on. The collector of transistor 110 is connected to the enable input of counter 93 and also through resistor 113 to +5 volt. When transistor 110 turns on, the collector goes low, pulling down the enable input (pin 2) to counter 93 and disabling the counter 93. At the same time the enable input (pin 4) of decoder 94 is held high, disabling the decoder. Eight steps or pulse widths have now been counted, up-counter 93 and decoder 94 are turned off, and another path is needed to discharge capacitor 97. When the fourth output bit (pin 6) of decoder 93 goes high, transistor 111 is also turned on, which discharges capacitor 97 through jumper 114 and resistor 115 or through front panel timing potentiometer 91. The soft start circuit 14 may also be externally controlled using the DECODER A,B,C, COUNTER and FINAL FREQUENCY signals, either with another board or with a computer.

Accordingly, a control system for a repeatable capacitor charging, switching power supply has been produced. The soft start circuit 14 counts pulses and sequentially selects one of nine transistors 102 and 111, and discharges a timing capacitor 97 at different rates. The different rates determine the pulse width. A voltage control circuit 16 suppresses feedback noise to provide a close tolerance on regulation. The control chip 38 is soft started whenever coming out of regulation. A current control circuit 15 suppresses noise from current feedback and tests for magnitude of current. When current is low it starts a dead time timer which allows the next pulse to proceed. The current control circuit 15 also tests for overcurrent, in which case it trips an overcurrent latch 84 and inhibits further pulses.

Changes and modifications in the specifically described embodiments can be carried out without departing from the scope of the invention which is intended to be limited only by the scope of the appended claims.

1. A switching power supply for charging a capacitive load, comprising;
 a step-up transformer having its secondary connected to the load;
 four power MOSFETs arrayed in a full bridge configuration connected to the primary of the step-up transformer;
 control means connected to the MOSFETs for alternately switching on and off diagonal pairs of the MOSFETs;
 soft start means connected to the control means for periodically adjusting pulse width to maintain approximate peak current to the load, the soft start means comprising a timing capacitor, a plurality of parallel timing resistors of different values connected to the timing capacitor, and selection means for sequentially selecting one of the timing resistors for discharging the timing capacitor with a time constant determined by the value of the selected timing resistor.

2. The supply of claim 1 further including a fast recovery diode connected in series with each MOSFET in each leg of the bridge and a fast recovery diode connected reverse biased across each leg of the bridge.

3. The supply of claim 2 further including a snubber circuit comprising a series resistor and capacitor connected across each MOSFET.

4. The supply of claim 1 further including a pair of capacitors connected in series with the primary of the step-up transformer.

5. The supply of claim 1 wherein the transformer secondary is connected to the load through a high voltage rectifier bridge, and whose leakage reactance is sufficient to limit output current without an inductor.

6. The supply of claim 1 wherein the selection means for sequentially selecting one of the timing resistors for discharging the timing capacitor with a time constant determined by the value of the selected timing resistor includes counting means for counting pulses from the control means to the MOSFETs.

7. The supply of claim 6 wherein the selection means comprises a ripple counter, a binary up-counter clocked by an output of the ripple counter, a decoder connected to the up-counter, and actuation means connected to the decoder and to the plurality of timing resistors.

8. The supply of claim 7 wherein the actuation means comprises a plurality of transistors, the base of a transistor being connected to a corresponding output of the decoder, the emitter of a transistor being connected to a corresponding timing resistor, a transistor being turned on by an active output from the decoder to select the corresponding timing resistor to discharge the capacitor.

9. The supply of claim 8 further including inhibit means to inhibit the up-counter from further counting after a count equal to the number of timing resistors has been reached, a final timing transistor which is turned on when the innibit means innibit the up-counter, and a final timing resistor connected between the final timing transistor and the timing capacitor to provide the final pulse width.

10. The supply of claim 9 further including a potentiometer in series with the final timing resistor.

11. The supply of claim 1 further including voltage control means to regulate the voltage to the load allowing only whole, alternating pulses.

12. The supply of claim 11 wherein the voltage control means comprises comparator means for comparing a set voltage with a feedback voltage and a signal generation means for producing a signal to the control means to increase the pulse width of pulses from the control means to the MOSFETs when the feedback voltage does not equal the set voltage.

13. The supply of claim 1 further including current control means to detect current greater than the normal operating current in the MOSFET bridge and to apply a signal to the control means to prevent further pulses from being applied to the MOSFET bridge.

14. The supply of claim 13 wherein the current control means comprises a differential amplifier having as inputs primary current signals from the MOSFET bridge, a pair of high speed comparators having the output of the differential amplifier connected to the positive input of one and the negative input of the other, the trip level of the comparators being set above the peak rating of the MOSFETs, and a NAND gate latch connected to the outputs of the comparators, the output of the latch being connected to the control means to disable the control means when the trip level is exceeded.

* * * * *